United States Patent [19]

Knoll et al.

[11] Patent Number: 5,585,442
[45] Date of Patent: Dec. 17, 1996

[54] ADHESIVE BASED ON ANIONICALLY POLYMERIZED STYRENE/BUTADIENE COPOLYMERS

[75] Inventors: Konrad Knoll, Ludwigshafen; Gerhard Schumacher, Heidelberg; Uwe Dittrich, Ludwigshafen, all of Germany

[73] Assignee: BASF Aktiengesellschaft, Ludwigshafen, Germany

[21] Appl. No.: 430,472

[22] Filed: Apr. 28, 1995

[30] Foreign Application Priority Data

May 3, 1994 [DE] Germany .......................... 44 15 448.8

[51] Int. Cl.⁶ .................................................. C08L 25/02
[52] U.S. Cl. ........................... 525/241; 526/340; 428/500
[58] Field of Search .................... 525/241, 340; 428/500

[56] References Cited

U.S. PATENT DOCUMENTS

| | | |
|---|---|---|
| 3,935,338 | 1/1976 | Robertson . |
| 4,659,784 | 4/1987 | Chung et al. ............................ 525/294 |
| 4,728,572 | 3/1988 | Davis . |
| 5,166,274 | 11/1992 | McGrath et al. ........................ 525/310 |
| 5,360,855 | 11/1994 | Gobran .................................. 524/274 |

FOREIGN PATENT DOCUMENTS

| | | |
|---|---|---|
| 0076539 | 4/1983 | European Pat. Off. . |
| 0082399 | 6/1983 | European Pat. Off. . |
| 0318217 | 5/1989 | European Pat. Off. . |
| 0569100 | 11/1993 | European Pat. Off. . |
| 1156300 | 6/1969 | United Kingdom . |
| 2267284 | 12/1993 | United Kingdom . |
| WO92/01432 | 2/1992 | WIPO . |

*Primary Examiner*—Melvyn I. Marquis
*Assistant Examiner*—D. Aylward
*Attorney, Agent, or Firm*—Oblon, Spivak, McClelland, Maier & Neustadt, P.C.

[57] ABSTRACT

An adhesive containing an anionically polymerized copolymer based on a) from 10 to 90 wt % of vinyl aromatics,
b) from 10 to 90 wt % of a conjugated diene, and
c) from 0 to 30 wt % of other monomers and having a number-average molecular weight $\overline{M}_n$ of from 2,000 to 250,000 and optionally having a content of homopolymer blocks having a gram-molecular weight which is greater than one twentieth of the number-average molecular weight, said content being less than 40 wt %, based on the copolymer.

4 Claims, No Drawings

ADHESIVE BASED ON ANIONICALLY POLYMERIZED STYRENE/BUTADIENE COPOLYMERS

The invention relates to an adhesive containing an anionically copolymer based on a) from 10 to 90 wt % of vinyl aromatics, b) from 10 to 90 wt % of a conjugated diene, and c) from 0 to 30 wt % of other monomers and having a number-average molecular weight $\overline{M}_n$ of from 2,000 to 250,000 and optionally having a content of homopolymer blocks having a gram-molecular weight which is greater than one twentieth of the number-average molecular weight, said content being less than 40 wt %, based on the copolymer.

A great variety of polymers can be used as the polymeric basis of adhesives, for example polymers based on natural rubber, polyolefins, poly(vinyl ether)s, polyacrylates, or styrene/butadiene copolymers. Such polymers are generally used in the form of dispersions or solutions. In order to impart adequate tack to said dispersions or solutions, it is usual to admix tackifying resins, eg colophonium.

U.S. Pat. No. 3,935,338, U.S. Pat. No. 4,728,572, and EP-A 318,217 describe hot-melt adhesives based on styrene/butadiene copolymers. These hot-melt adhesives are essentially free from organic solvents, but it is still necessary to supplement them with tackifying resins. It is desirable to keep the number of the ingredients contained in adhesives and of the substances added thereto to a minimum to reduce material and labor costs.

It was thus the object of the present invention to provide an adhesive which is essentially free from solvents and exhibits adequate tack without the addition of tackifying resins.

Accordingly, we have found the adhesive defined above.

The adhesive defined above contains a copolymer comprising, preferably, a) from 30 to 70 wt %, more preferably from 40 to 70 wt %, of a vinyl aromatic compound, b) from 30 to 70 wt %, more preferably from 30 to 60 wt %, of a conjugated diene, and c) from 0 to 20 wt %, more preferably from 0 to 10 wt %, of other monomers.

Suitable vinyl aromatics are styrene, alkyl-substituted styrenes such as p-methylstyrene, p-tert-butylstyrene, alkoxy-substituted styrenes such as p-methoxystyrene, silylized styrenes such as p-styrene, vinyl naphthalene, and alkyl-substituted alkyl naphthalenes, α-methylstyrene, copolymers with 1,1-diphenylethylene and alkylated derivatives thereof, as well as mixtures of said monomers. The preferred monomer is styrene.

Suitable conjugated dienes are 1,3-butadiene, 1,3-octadiene, piperylene, methylpentadiene, phenylbutadiene, 2,3-dimethylbutadiene, 3,4-dimethyl-1,3-hexadiene, 4,5-diethyl-1,3-octadiene, and mixtures of said monomers. The preferred monomer is 1,3-butadiene.

The other monomers can be, eg, those capable of being copolymerized during the anionic polymerization.

Examples thereof are 2-, 3-, and 4-vinyl pyridines, dialkylaminostyrenes, 1,1-diphenylethylene, and dialkylamino-1,1-diphenylethylene. Functional groups such as carboxyl, hydroxy, silanol, amino, and carboxylic anhydride groups can be directly introduced into the copolymer by copolymerization of appropriate monomers.

Alternatively, the aforementioned functional groups may be introduced into the copolymer by using suitable monomers which can then be functionalized by appropriate reactions.

It is possible to introduce specifically one carboxyl group per living chain end by first effecting end-group modification of the living polymer with one equivalent of 1,1-diphenylethylene followed by reaction with $CO_2$ and protic treatment. Any desired number of terminal carboxyl groups can be introduced via block copolymerization with tert-butyl methacrylate. To this end, the living polymer which has been modified with 1,1-diphenylethylene is caused to react with the desired number of equivalents of tert-butyl methacrylate at a temperature of from −20° to 60° C., and isobutene is removed from the poly(tert-butyl methacrylate) block either thermally at a temperature ranging from 180° to 200° C. or by acid catalysis using, eg, 0.1 equivalent of p-toluenesulfonic acid per equivalent of tert-butyl methacrylate at a temperature of from 80° to 100° C., with the formation of poly(methacrylic acid), or saponification is carried out in the presence of dilute aqueous protonic acid.

Hydroxyl end groups may be directly introduced by the reaction of the living polymer with ethylene oxide or propylene oxide to form, eg, the lithium alcoholate, followed by protic treatment using, say, an alcohol or water. An interesting variant is provided by the reaction of the carbanionic chain ends with oligoepoxides such as the tetraglycidyl ether of pentaerythritol, in which case equimolar amounts are preferred in order to suppress coupling as far as possible. The remaining epoxy groups can then be opened with ammonia or a primary or secondary amine with the formation of the corresponding ethanolamines.

Amino end groups can be introduced by the reaction of the living polymer with an imine such as benzylidene aniline and its derivatives alkylated in the nucleus and benzylidene trimethylsilyl amine to form the amide followed by protolysis to the secondary or primary amine respectively. The amines can then be caused to react with epoxides and acid anhydrides to produce ethanolamines or acid amines. The use of dianhydrides or oligoanhydrides such as pyromellitic anhydride or copolymers of maleic anhydride in a molar ratio of 1:1 makes anhydride-terminated polymers available.

Diaminopropylene end groups are available via the reaction of the living polymer with propylene diaziridine followed by acid treatment with the liberation of formaldehyde. Since propylene diaziridine itself polymerizes under anionic conditions, the use of the desired number of equivalents of propylene diaziridine can bring about the introduction of propylene-linked oligo- or poly-hydrazines as end groups.

A combination of different functional groups can be present in one and the same polymer molecule. An interesting combination of amino and carboxyl groups is provided by the copolymerization of the monomers carrying the aforementioned tertiary amino groups followed by block copolymerization with tert-butyl methacrylate and thermal elimination of isobutene. The polymer thus produced behaves like a betain and is suitable for the preparation of secondary dispersions.

The copolymer preferably contains carboxyl groups as the functional groups. It is particularly preferred that the ratio of the total molecular weight and the number of carboxyl groups in the molecule be from 0.2 to 1 carboxyl group per 1,000 g of copolymer.

The number-average molecular weight $\overline{M}_n$ of the copolymer is from 2,000 to 250,000, preferably from 4,000 to 60,000 and more preferably from 5,000 to 40,000.

The molecular weight $\overline{M}_n$ is determined by gel permeation chromatographie, a mixed standard being formed from a polystyrene standard and a polybutadiene standard marketed by Polymer Laboratories in accordance with the contents of polystyrene and polybutadiene in the sample (cf G. Glöckner, *Polymercharakterisie-rung durch Flüüssigkeitschromatographie*, Heidelberg 1982). Readings were taken in a 0.25wt % strength solution in tetrahydrofuran at 23° C. and a flow rate of 1.2 mL/min.

The content of homopolymer blocks having a molecular weight greater than one twentieth, and preferably greater than one fortieth, of the said number-average molecular weight $\overline{M}_n$ if present, is below 40 wt % and preferably below 20 wt % and more preferably below 10wt %, based on the copolymer. The copolymer is very preferably a substantially random copolymer.

The glass transition temperature Tg of the copolymer is preferably below 0° C. and more preferably below −10° C. The glass transition temperature of the copolymer can be determined by conventional methods such as differential thermoanalysis or differential scanning calorimetry (cf, eg, ASTM 3418/82, "midpoint temperature").

The quotient $\overline{M}_w/\overline{M}_n$ preferably has the value of 1 to 1.5 and is more preferably equal to 1 to 1.2.

For this evaluation, the $\overline{M}_w$ (weight-average molecular weight) and the $\overline{M}_n$ are determined by gel permeation chromatography as described above.

The polymerization is carried out, eg, in solution in the presence of an initiator for the anionic polymerization. Suitable initiators are, eg, lithium organyls of the class $R(Li)_n$, where R denotes an aliphatic, cycloaliphatic, aromatic, or alkyl-substituted aromatic n-valent hydrocarbon radical and n is an integer from 1 to 10. Examples of such lithium organyls are methyllithium, ethyllithium, n-propyllithium, isopropyllithium, n-butyllithium, sec-butyllithium, tert-butyllithium, phenyllithium, benzyllithium, 1,4-dilithiobutane, 1,4-dilithio-1,1,4,4-tetraphenylbutane and its derivatives alkylated in the nucleus, 1,4-dilithio-2,3-dialkyl-1,4-diphenylbutane, where alkyl designates methyl, ethyl, propyl, butyl, hexyl, heptyl, octyl, isooctyl, etc. Also suitable are dilithiostilbene and dilithiodiphenylacetylene, as are sodium naphthalene and its derivatives. The initiator used is preferably n-butyllithium or sec-butyllithium.

It is well known that the copolymerization parameters valid for anionic polymerization of vinyl aromatics and conjugated diolefins are governed to a great extent by the solvent used. In a non-polar hydrocarbon, a mixture of styrene and butadiene preferentially affords polymerization of the butadiene. In this case there is produced a butadiene-co-styrene block polymer having a 'blurred' transition, that is to say, a delimited zone of the polymer chain contains a random copolymer. In coordinating solvents the copolymerization parameters are reversed and blocks are again obtained but with styrene being the first to polymerize. Another point to observe is that in non-polar media the diene component is preferentially added in 1,4 configuration, in polar media, on the other hand, in 1,2 configuration. The glass transition temperature of poly(1,4-butadiene) is approximately −100° C., whilst that of poly(1,2-butadiene) is −20 ° C.

However, substantially random polymerization can be achieved under anionic conditions if a specific amount, in particular from 0.01 to 5 wt %, of a polar modifying agent is added to a non-polar solvent. Examples of such modifiers are linear ethers such as diethyl ether, dimethyl ether, ethylmethyl ether, dipropyl ether, diisopropyl ether, dibutyl ether, methyl-tert-butyl ether, dimethoxy ethane, dimethoxy propane, dimethoxy butane, diethoxy ethane, diethylene glycol dimethyl ether, diethylene glycol diethyl ether, anisol, ethoxystyrene, and dimethyl cresyl ether, cyclic ethers such as tetrahydrofuran, 1,4-dioxan, furfuryl methyl ether, crown ethers such as 18-crown-6 and dibenzo-18-crown-6, tertiary amines such as trimethylamine, triethylamine, tripropylamine, tributylamine, dimethylaniline, diethylaniline, pyridine, and tetramethylethylene diamine, and alcoholates such as potassium tert-butanolate, lithium tert-butanolate, lithium-2,6-di-tert-butylphenolate. Tetrahydrofuran is preferred.

Examples of non-polar solvent components are aliphatic or aromatic hydrocarbons such as cyclopentane, cyclohexane, methylcyclohexane, benzene, methylbenzenes, etc, and mixtures thereof with each other and, if necessary, with n-alkanes. Cyclohexane and methylcylohexane are particularly preferred.

Random polymerization is achieved when the monomeric mixture of vinyl aromatic compound and conjugated diene is added to the initial mixture of initiator, solvent, and modifier at a sufficiently slow rate to allow the monomers to react continuously without accumulation of monomer.

The temperature of polymerization can be, for example, in the range of −30° to 140° C., preferably +30° to 100° C. and more preferably 60° and 70° C.

The anionic polymerization gives living copolymers, that is to say, the polymerization can be continued after adding selected monomers. This makes it possible to introduce functionalized monomers into the polymer as described above.

Polymerization can also be controlled by varying the ratio of the monomers a), b) and c) in the polymer chain along its length so that a portion having a higher Tg (attained by using a higher styrene content for example)—a hard phase—can be followed by a portion having a lower Tg (attained by using a lower styrene content for example)—a soft phase.

On completion of the reaction, the product is worked up by protic means, eg using water/$CO_2$, neutralized, if necessary, with an acid, and washed, after which the polymer is freed from solvent, if required.

The copolymers thus obtained are used as adhesives, preferably as pressure-sensitive adhesives and more preferably as hot-melt pressure-sensitive adhesives.

When used as hot-melt pressure-sensitive adhesive, the copolymer is substantially freed from any solvent which may have been used during copolymerization, such that the residual content of solvent is preferably less than 5 wt % and more preferably less than 0.05 wt %, based on the copolymer. It is not usually necessary to add tackifiers, as the copolymer exhibits very good tack and also very good cohesion (internal adhesion, good shear strength).

Neither is it generally necessary to include a plasticizer.

Additives that can be included are, for example, mineral oils, phthalates, colophoniums, and other tackifiers.

To achieve special properties, use can be made of mixtures of the anionically polymerized copolymers having different molecular weights. Suitable starting components for such mixtures are, for example, copolymers A) having molecular weights $\overline{M}_n$ between 2,000 and 20,000, preferably between 5,000 and 15,000, on the one hand, and copolymers B) having molecular weights $\overline{M}_n$ between 20,000 and 250,000, preferably between 20,000 and 100,000, on the other hand, where the $\overline{M}_n$ of copolymer B) is at least 5,000 higher than that of copolymer A).

The proportions of the copolymers A) and B) can be varied as desired. The content of one or other in the mixture is generally from 20 wt % to 80 wt %, based on the total of A) and B).

If, for example, good adhesion is required, the content of A) can advantageously be from 40 to 60 wt % and that of B) from 60 to 40 wt %.

When used as general adhesives or hot-melt pressure-sensitive adhesives, the copolymers may be applied to the substrates to be bonded by any simple method such as brush-coating, knife-coating, etc.

Suitable substrates are, for example, wood, metal, plastics, stone, concrete, paper, and textiles of natural or synthetic fibers or leather. The copolymers are preferably applied to the surfaces of both of the parts to be joined.

In some cases it may be advantageous to activate the coated substrates prior to fixing, for example by raising the temperature thereof to from 30° to 150° C.

The adhesives of the invention are distinguished by their good adhesion (good tack, high peeling strength) combined with good cohesion (good shear strength). They can be used substantially free from solvents and require no addition of plasticizers or tackifiers such as colophoniums.

MANUFACTURING EXAMPLES

1. Random poly(styrene-co-butadiene)

In a stirred autoclave having a capacity of 10 L, a mixture of 4762mL of cyclohexane, 2 mL of 1,1-diphenylethylene (DPE), and 12.7 mL of tetrahydrofuran (THF) was titrated, under a blanket of nitrogen at a temperature of 25° C., with 0.11 M solution of sec-butyllithium (s-BuLi) in cyclohexane until the color changed to red. To the solution there were added 142.6 mL (156.9 mmol) of a 0.11 M s-BuLi solution, and the resulting solution was added to a mixture of 660 mL of styrene and 2154 mL of butadiene in 10 portions. After the addition of each portion, the next portion was not added until the color of the reaction mixture had turned red. At the moment of addition, the temperature was adjusted to 70° C. It rose to 75° C. Following the addition of the last portion, polymerization was allowed to continue for 20 min at 70° C., after which 42.4 g of 1,1-diphenylethylene (excess of 1.5 times over s-BuLi). The color deepened. After a period of 15 min, the mixture was cooled to 8° C., and 100 mL of THF and 170 mL of tert-butyl methacrylate were added. Following a period of 30 min at 8° C. the solution had become colorless. Polymerization was stopped by the addition of 10 mL of isopropanol, and the product was stabilized with 0.2% of Irgonax 1076 and 0.2% of trisnonylphenyl phosphite.

$\overline{M}_n$ (GPC)=16500.

2. Preparation was carried out as described under 1) except that 285.2 mL of s-BuLi solution and 84.8 g of 1,1-DPE were used.

$\overline{M}_n$ (GPC)=8160.

3. Preparation was carried out as described under 1) except that 71.3 mL of S-BuLi solution and 21.2 g of 1,1-DPE were used.

$\overline{M}_n$ (GPC)=32280.

APPLICATION EXAMPLES

Bonds made with the copolymers thus prepared and mixtures thereof were tested for shear strength, peeling strength, and quick-stick value.

A polyester film was coated with copolymer or copolymer mixture at a spread rate of 20 g/cm.

The adhesive was activated for 3 min at 90° C. prior to bonding.

The substrate was sliced into test strips.

To determine the shear strength, the test strips were stuck to a chromium-plated panel of V2A steel over an area of one half inch square. A roller weighing 1 kg was rolled over the adhesive bond once, which was left for 20 min before the panel was suspended and a weight of 0.5 kg attached to the test strip. The shear strength was taken to be the time for the weight to drop, as a mean of five readings. In this test the adhesive layer was destroyed (cohesion break).

The shear strength was measured at 23° C.

To determine the peeling strength (adhesion), a test strip having a width of 2 cm was stuck to a chromium-plated panel of V2A steel and pressed once under a roller weighing 1 kg. One end of the strip was then clamped in the top jaw of an extensometer. The strip was then peeled from the test surface (V2A steel) at a rate of 300 mm/min and an angle of 180° and the force required was measured. The peeling strength was taken to be said force in N/2 cm, as a mean of 5 readings.

The peeling strength was determined 1 min (instant value) and 20 min after the bond had been created.

Determination of the quick-stick value was effected by clamping the two ends of a test strip measuring 17.5 cm in length and 2 cm in width in the jaws of a tension testing machine such that the strip formed a loop, which was then lowered toward a chromium-plated steel panel at a speed of 30 cm/min until it contacted the panel. Following full contact, the loop was immediately removed from the panel, and the maximum force in N/2 cm required to effect separation was taken to be the quick-stick value (loop value, tack).

The results are listed in the table below.

| Molecular Weight $M_n$ (g/mol) | Functionality | Quick-stick (N/2 cm) | Peeling Strength (N/2 cm) | Shear Strength (hours) |
| --- | --- | --- | --- | --- |
| 32,280 | COOH | 1 | 3 | >96 |
| 1:1 Blend 32,280 + 16,500 | COOH | 5 | 10 | 43 |
| 1:1 Blend 32,280 + 8,160 | COOH | 10 | 8 | 6 |

We claim:

1. An adhesive consisting essentially of an anionically randomly polymerized copolymer based on
   a) from 10 to 90 wt % of vinyl aromatics,
   b) from 10 to 90% of a conjugated diene, and
   c) from 0 to 30 wt % of other monomers and having a number-average molecular weight $M_n$ of from 2,000 to 250,000, wherein said copolymer has a non-uniformity ratio of the copolymer $M_w/M_n$ of 1 to 1.5, has the property of a pressure-sensitive adhesive, and is essentially free from additional tackifying resins, or solvents or plasticizers.

2. An adhesive as defined in claim 1, wherein the polymer additionally contains carboxyl groups.

3. An adhesive containing at least two anionically polymerized copolymers A) and B) as defined in claim 1, wherein
   A) has a molecular weight $\overline{M}_n$ between 2,000 and 20,000 and
   B) has a molecular weight $\overline{M}_n$ between 20,000 and 250,000, the molecular weight of B) being at least 5,000 higher than that of A) and the weights of A) and B) being from 20 to 80 wt %, based on the sum of A) and B).

4. A substrate coated with an adhesive as defined in claim 1.

* * * * *